(12) United States Patent
Tseng

(10) Patent No.: US 9,354,380 B2
(45) Date of Patent: May 31, 2016

(54) LIGHT DIFFUSION PLATE AND BACKLIGHT MODULE USING SAME

(71) Applicant: HON HAI PRECISION INDUSTRY CO., LTD., New Taipei (TW)

(72) Inventor: Yung-Chang Tseng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 200 days.

(21) Appl. No.: 14/144,570

(22) Filed: Dec. 31, 2013

(65) Prior Publication Data

US 2014/0198523 A1   Jul. 17, 2014

(51) Int. Cl.
*F21V 8/00* (2006.01)
(52) U.S. Cl.
CPC ............ *G02B 6/0051* (2013.01); *G02B 6/0061* (2013.01)

(58) Field of Classification Search
CPC ........................... G02B 6/0051; G02B 6/0061
USPC .................................................. 362/606, 355
See application file for complete search history.

(56) References Cited

U.S. PATENT DOCUMENTS

| 7,597,467 B2 * | 10/2009 | Itaya ................... G02B 6/0068 362/231 |
| 7,976,207 B2 * | 7/2011 | Kim ..................... G02B 6/0036 362/355 |

* cited by examiner

*Primary Examiner* — David V Bruce
(74) *Attorney, Agent, or Firm* — Novak Druce Connolly Bove + Quigg LLP

(57) ABSTRACT

A light diffusion plate includes a light-emitting region and an atomization reinforcing region connected to the light-emitting region. Light passing through the atomization reinforcing region is more greatly diffused than light passing through the light-emitting region.

15 Claims, 2 Drawing Sheets

LIGHT DIFFUSION PLATE AND BACKLIGHT MODULE USING SAME

BACKGROUND

1. Technical Field

The present disclosure relates to a light diffusion plate and a backlight module using the same.

2. Description of Related Art

Liquid crystal display (LCD) devices have many excellent performance characteristics and are widely used. LCD devices generally include a backlight module. The backlight module is used to diffuse light emitted from linear light sources, such as cold cathode ray tubes or light emitting diodes (LEDs).

However, if only one LED is employed by the LCD device as the light source, the backlight module may not be able to diffuse the light uniformly across a whole light guiding plate of the backlight module. Additionally, if a number of LEDs are employed, a number of dark regions may be formed in areas of the light guide plate between adjacent LEDs.

Therefore, it is desirable to provide a light diffusion plate and a backlight module using the same to overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Figure 1:
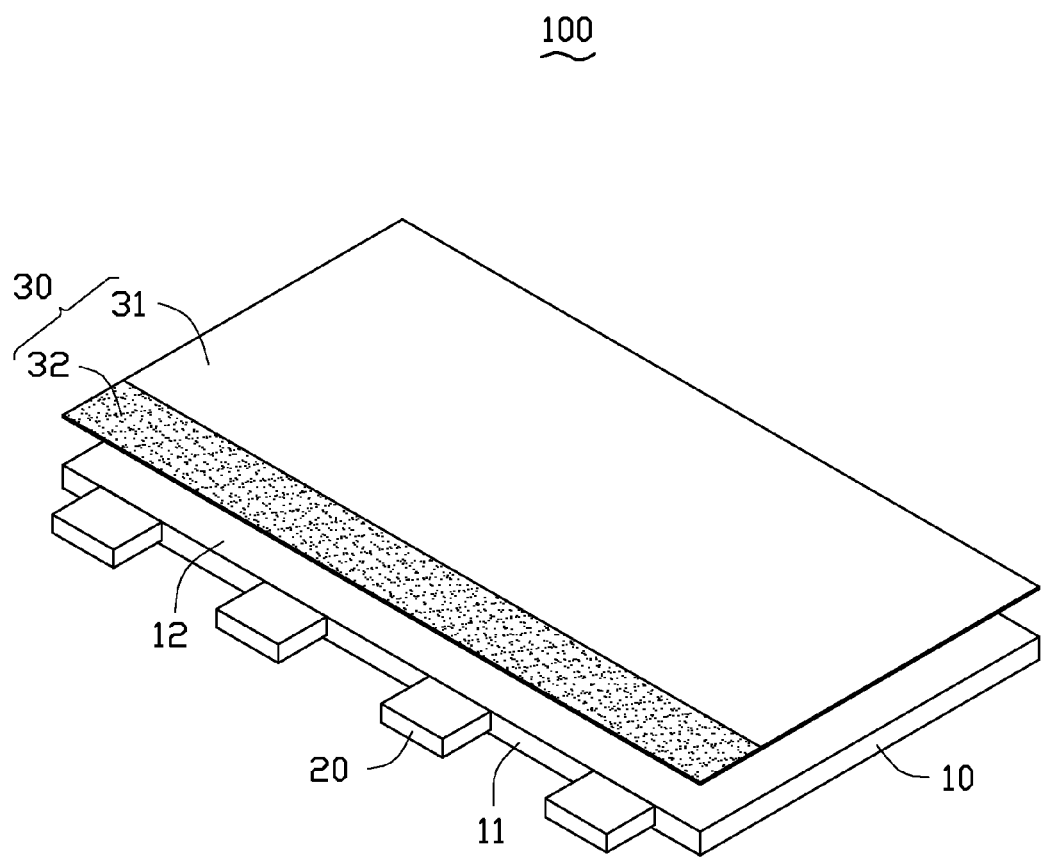
FIG. 1 is an exploded, isometric view of a first embodiment of a backlight module.

FIG. 1 shows a first embodiment of a backlight module 100 for a display. The backlight module 100 includes a light guiding plate 10, a number of light sources 20, and a light diffusion plate 30.

The light guiding plate 10 includes a light incident surface 11 and a light emitting surface 12. The light emitting surface 12 is connected substantially perpendicularly to the light incident surface 11. In one embodiment, the light guiding plate 10 is made of a yellow phosphor powder. The yellow phosphor powder is made of $Y_3Al_5O_{12}:Ce^{3+}$ (cerium-doped yttrium aluminum garnet).

In one embodiment, each light source 20 is a point light source, such as a blue light-emitting diode (LED). The light sources 20 are located on the light incident surface 11.

The light diffusion plate 30 is located on the light emitting surface 12. A shape and a size of the light diffusion plate 30 respectively correspond to a shape and a size of the light guiding plate 10. The light diffusion plate 30 includes a light-emitting region 31 and an atomization reinforcing region 32 connected to the light-emitting region 31. The atomization reinforcing region 32 is more adjacent to the light incident surface 11 than the light-emitting region 31. The light diffusion plate 30 is substantially rectangular. Material of the light diffusion plate 30 can be, but is not limited to, silica, poly (methyl methacrylate) (PMMA), glass, or plastic. A distribution density of the material of the atomization reinforcing region 32 is greater than a distribution density of the material of the light-emitting region 31. Thus, light passing through the atomization reinforcing region 32 is more greatly diffused than light passing through the light-emitting region 31.

In other embodiments, the light diffusion plate 30 also forms a number of microstructures, such that a distribution density of the microstructures on the atomization reinforcing region 32 is larger than that of the light-emitting region 31.

In operation, blue light emitted from the light sources 20 enters the light guiding plate 10 through the light incident surface 11. The blue light stimulates the yellow phosphor powder of the light guiding plate 10 to emit yellow light. The yellow light mixes with the blue light to form white light. The white light enters into the light diffusion plate 30 through the light emitting surface 12. The light diffusion plate 30 diffuses the white light and enlarges a field of illumination of the white light.

Unlike conventional backlight modules, the light diffusion plate 30 of the backlight module 100 has the atomization reinforcing region 32, which converts point light emitted by the light sources 20 into surface light. Thus, uniformity of illumination of the backlight module 100 is improved.

Figure 2:
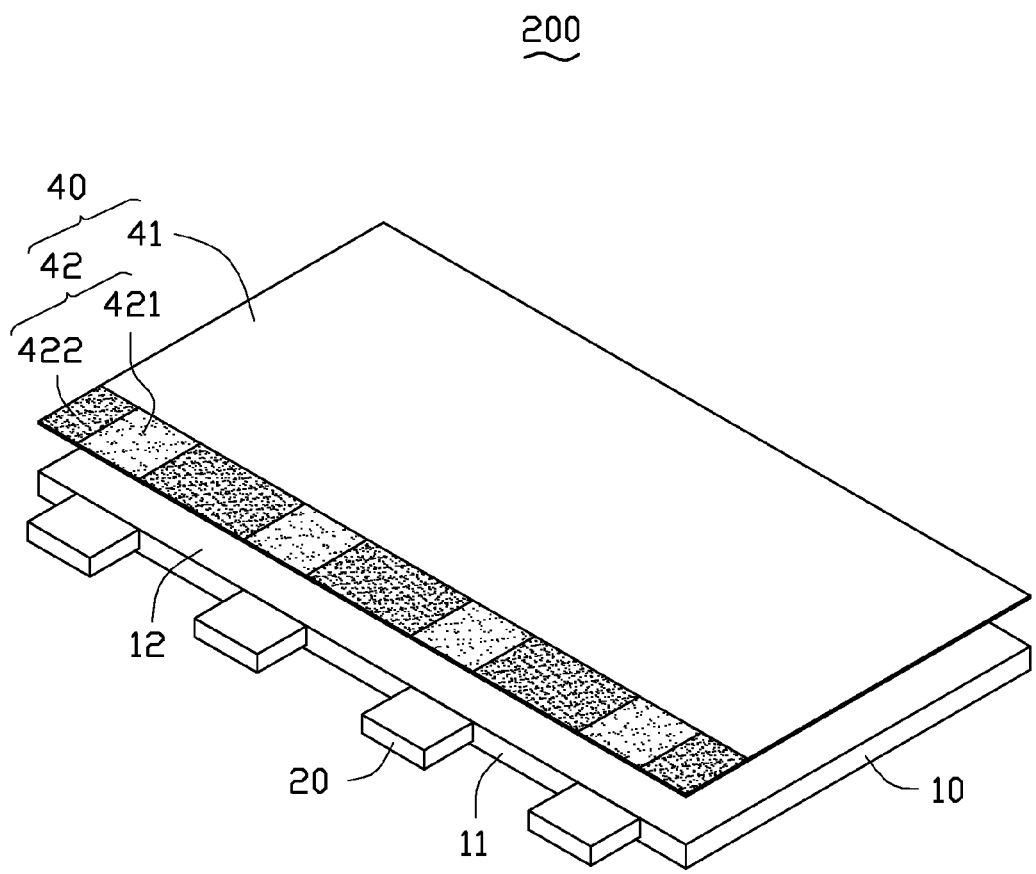
FIG. 2 is an exploded, isometric view of a second embodiment of a backlight module.

FIG. 2 shows a second embodiment of a backlight module 200 for a display. The backlight module 200 is essentially similar to the backlight module 100 in the first embodiment, except that a light diffusion plate 40.

In one embodiment, the light diffusion plate 40 includes a light-emitting region 41 and an atomization reinforcing region 42 connected to the light-emitting region 41. The atomization reinforcing region 42 is more adjacent to the light incident surface 11 than the light-emitting region 41. The light diffusion plate 40 is substantially rectangular. In one embodiment, light passing through the atomization reinforcing region 42 is diffused more than light passing through the light-emitting region 41.

In one embodiment, the atomization reinforcing region 42 includes a number of first atomization reinforcing regions 421 and a number of second atomization reinforcing regions 422. Each first atomization reinforcing region 421 is located between two adjacent second atomization reinforcing regions 422. Each first atomization reinforcing region 421 spatially corresponds to a space formed by two adjacent light sources 20. Light passing through the first atomization reinforcing region 421 is more greatly diffused than light passing through the second atomization reinforcing region 422. The light diffusion plate 40 of the second embodiment can be made of similar materials as the light diffusion plate 30 of the first embodiment. A distribution density of the material of the first atomization reinforcing region 421 is greater than a distribution density of the material of the second atomization reinforcing region 422.

In other embodiments, the light diffusion plate 40 also forms a number of microstructures, wherein a distribution density of the microstructures on the first atomization reinforcing region 421 is greater than that of the second atomization reinforcing region 421.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A light diffusion plate comprising:
   a light-emitting region; and
   an atomization reinforcing region connected to the light-emitting region, wherein light passing through the atomization reinforcing region is more greatly diffused than light passing through the light-emitting region, wherein the light diffusion plate comprises a plurality of microstructures, a distribution density of the microstructures on the atomization reinforcing region is larger than that of the light-emitting region.

2. The light diffusion plate of claim 1, wherein a distribution density of the material of the atomization reinforcing region is greater than a distribution density of the material of the light-emitting region.

3. The light diffusion plate of claim 2, wherein the material of the light diffusion plate is silica, PMMA, glass, or plastic.

4. The light diffusion plate of claim 1, wherein the atomization reinforcing region comprises a plurality of first atomization reinforcing regions and a plurality of second atomization reinforcing regions, each first atomization reinforcing region is located between two adjacent second atomization reinforcing regions, light passing through the first atomization reinforcing regions is more greatly diffused than light passing through the second atomization reinforcing regions.

5. The light diffusion plate of claim 4, wherein the atomization reinforcing region is made of a diffusion material, a distribution density of the diffusion material of the first atomization reinforcing regions is greater than a distribution density of the second atomization reinforcing regions.

6. The light diffusion plate of claim 4, wherein the atomization reinforcing region comprises a plurality of microstructures, a distribution density of the microstructures on the first atomization reinforcing regions is larger than that of the second atomization reinforcing regions.

7. A backlight module comprising:
   a light guiding plate comprising a light incident surface and a light emitting surface;
   a plurality of light sources located on the light incident surface;
   a light diffusion plate positioned on the light emitting surface, the light diffusion plate comprising:
      a light-emitting region; and an atomization reinforcing region connected to the light-emitting region, wherein the atomization reinforcing region is more adjacent to the light incident surface than the light-emitting region, light passing through the atomization reinforcing region is more greatly diffused than light passing through the light-emitting region.

8. The backlight module of claim 7, wherein the light emitting surface is connected substantially perpendicularly to the light incident surface.

9. The backlight module of claim 7, wherein the light guiding plate is made of a yellow phosphor powder, each light source is a blue LED.

10. The backlight module of claim 9, wherein the material of the yellow phosphor powder is made of cerium-doped yttrium aluminum garnet.

11. The backlight module of claim 7, wherein the atomization reinforcing region comprises a plurality of first atomization reinforcing regions and a plurality of second atomization reinforcing regions, each first atomization reinforcing region spatially corresponds to a space formed by two adjacent light sources, light passing through the first atomization reinforcing regions is more greatly diffused than light passing through the second atomization reinforcing regions.

12. The backlight module of claim 11, wherein the atomization reinforcing region is made of a diffusion material, a distribution density of the diffusion material of the first atomization reinforcing regions is greater than a distribution density of the second atomization reinforcing regions.

13. The backlight module of claim 7, wherein a distribution density of the material of the atomization reinforcing region is greater than a distribution density of the material of the light-emitting region.

14. The backlight module of claim 13, wherein the material of the light diffusion plate is silica, PMMA, glass, or plastic.

15. The backlight module of claim 7, wherein the light diffusion plate comprises a plurality of microstructures, a distribution density of the microstructures on the atomization reinforcing region is larger than that of the light-emitting region.

* * * * *